(12) United States Patent
Park

(10) Patent No.: US 10,159,922 B2
(45) Date of Patent: Dec. 25, 2018

(54) APPARATUS FOR REMOVING CONTAMINATED MATERIAL

(71) Applicant: KF E&E CO., LTD., Seoul (KR)

(72) Inventor: Seong-Kyu Park, Seoul (KR)

(73) Assignee: KF E&E CO., LTD., Seoul (KR)

( * ) Notice: Subject to any disclaimer, the term of this patent is extended or adjusted under 35 U.S.C. 154(b) by 239 days.

(21) Appl. No.: 15/015,169

(22) Filed: Feb. 4, 2016

(65) Prior Publication Data

US 2016/0151734 A1 Jun. 2, 2016

Related U.S. Application Data

(63) Continuation of application No. 13/588,475, filed on Aug. 17, 2012, now Pat. No. 9,278,359.

(30) Foreign Application Priority Data

Dec. 8, 2011 (KR) .................. 10-2011-0131267
Feb. 28, 2012 (KR) .................. 10-2012-0020072

(51) Int. Cl.
| | | |
|---|---|---|
| B01D 50/00 | (2006.01) | |
| B01D 45/08 | (2006.01) | |
| B01D 45/16 | (2006.01) | |
| B01D 45/12 | (2006.01) | |
| B01D 46/24 | (2006.01) | |
| B03C 3/017 | (2006.01) | |
| B01D 53/10 | (2006.01) | |
| B01D 45/04 | (2006.01) | |
| F24D 11/00 | (2006.01) | |

(52) U.S. Cl.
CPC ............. *B01D 45/08* (2013.01); *B01D 45/12* (2013.01); *B01D 45/16* (2013.01); *B01D 46/2411* (2013.01); *B01D 50/002* (2013.01); *B01D 53/10* (2013.01); *B03C 3/017* (2013.01); *B01D 45/04* (2013.01); *F24D 11/007* (2013.01); *F24D 11/008* (2013.01)

(58) Field of Classification Search
CPC ...... B03C 3/017; F24D 11/007; F24D 11/008; B01D 45/04; B01D 45/08; B01D 53/10; B01D 46/2411; B01D 45/12; B01D 50/002; B01D 45/16
See application file for complete search history.

(56) References Cited

U.S. PATENT DOCUMENTS

| | | | | |
|---|---|---|---|---|
| 768,415 | A * | 8/1904 | Wingrove ............. | B01D 45/08 55/444 |
| 960,223 | A * | 5/1910 | Guillaume ............. | B01D 3/008 261/110 |
| 1,519,428 | A * | 12/1924 | Wilisch .................. | B01D 45/08 159/31 |
| 1,632,325 | A * | 6/1927 | Anderson ............. | B01D 45/08 55/446 |

(Continued)

*Primary Examiner* — Dung H Bui
(74) *Attorney, Agent, or Firm* — Davis & Bujold PLLC; Michael J. Bujold

(57) ABSTRACT

Disclosed herein is an apparatus for removing a contaminated material, the apparatus comprising: a housing having a first duct and a second duct; a plurality of partition walls slantly installed at the inside wall of the housing to form a zigzag air current; and a adsorbent discharging unit installed inside the housing to discharge an adsorbent to the zigzag air current.

13 Claims, 13 Drawing Sheets

(56) References Cited

U.S. PATENT DOCUMENTS

| | | | | |
|---|---|---|---|---|
| 1,824,485 A * | 9/1931 | Jourdain | ............... | F22B 37/265 55/434.2 |
| 1,871,546 A * | 8/1932 | McClafferty | ........... | F25B 43/02 55/446 |
| 1,896,833 A * | 2/1933 | Bramsen | ............... | B01D 50/00 251/127 |
| 1,926,262 A * | 9/1933 | Campbell | ............. | B01D 45/08 55/324 |
| 2,144,418 A * | 1/1939 | Schramm | .................. | B07B 7/00 209/11 |
| 2,246,349 A * | 6/1941 | Crum | ..................... | F23J 15/022 209/143 |
| 2,290,323 A * | 7/1942 | Graham | ................. | B01D 45/08 55/436 |
| 2,377,549 A * | 6/1945 | Gustafsson | ............ | B01D 45/08 55/318 |
| 2,487,115 A * | 11/1949 | Dyke | ................... | F02M 35/022 181/231 |
| 2,599,139 A * | 6/1952 | Stevenson | ............. | B01D 45/08 239/471 |
| 2,661,605 A * | 12/1953 | Liggett | .................. | F25B 43/02 55/446 |
| 2,873,816 A * | 2/1959 | Umbricht | ............... | B01D 45/16 261/112.1 |
| 2,903,087 A * | 9/1959 | Glasgow | ............ | B01D 19/0057 55/444 |
| 2,925,144 A * | 2/1960 | Kroll | ..................... | B01D 46/12 55/296 |
| 3,060,664 A * | 10/1962 | Morawski | ................. | B04C 5/12 55/338 |
| 3,065,587 A * | 11/1962 | Fordyce | .................... | F28C 1/16 261/DIG. 11 |
| 3,093,467 A * | 6/1963 | McLaughlin | .......... | B01D 45/06 137/472 |
| 3,266,224 A * | 8/1966 | Ferretti | ............... | B01D 47/028 55/446 |
| 3,315,445 A * | 4/1967 | De Seversky | ......... | B01D 47/06 261/79.2 |
| 3,358,580 A * | 12/1967 | Freese | .................... | B01D 45/08 454/277 |
| 3,443,364 A * | 5/1969 | Saltsman | ............... | B01D 47/06 261/116 |
| 3,444,669 A * | 5/1969 | Umbricht | ............. | B01D 47/085 261/28 |
| 3,527,030 A * | 9/1970 | Hungate | ................ | B01D 45/06 55/440 |
| 3,747,347 A * | 7/1973 | Ciraolo | .................. | F01N 1/083 55/446 |
| 3,834,135 A | 9/1974 | Jordan | | |
| 3,880,624 A | 4/1975 | Arnold et al. | | |
| 4,011,157 A | 3/1977 | Pennebaker, Jr. et al. | | |
| 4,197,907 A * | 4/1980 | Smith | ................ | F28D 7/1646 165/158 |
| 4,229,189 A | 10/1980 | Pircon | | |
| 4,337,069 A * | 6/1982 | German, Jr. | ............. | B01D 3/24 261/110 |
| 4,543,219 A * | 9/1985 | Yamato | ..................... | B01D 3/18 261/109 |
| 4,557,740 A | 12/1985 | Smith | | |
| 4,755,198 A * | 7/1988 | Darton | ................... | B01D 47/12 261/79.2 |
| 5,078,760 A | 1/1992 | Haldipur et al. | | |
| 5,149,347 A * | 9/1992 | Turner | ................... | B01D 45/08 55/446 |
| 5,211,729 A | 5/1993 | Sherman | | |
| 5,536,288 A * | 7/1996 | De Witt | ................ | B01D 45/04 55/440 |
| 5,687,707 A * | 11/1997 | Prasser | .................. | B01D 45/08 126/299 D |
| 5,809,940 A * | 9/1998 | James | .................... | B01D 45/08 110/245 |
| 6,454,824 B1 | 9/2002 | Maryamchik et al. | | |
| 6,454,825 B1 * | 9/2002 | Cheimets | ............... | B01D 45/08 55/446 |
| 6,543,526 B2 * | 4/2003 | Jacobs | ................ | F24C 15/2035 126/299 D |
| 7,166,140 B2 * | 1/2007 | Entezarian | ............. | B01D 45/08 55/320 |
| 7,252,807 B2 * | 8/2007 | Hopkins | ................ | B01D 45/06 257/E21.008 |
| 7,329,295 B2 | 2/2008 | Greene et al. | | |
| 7,604,676 B2 | 10/2009 | Braziunas | | |
| 8,465,574 B2 * | 6/2013 | Horne | ........................ | A47L 9/10 55/DIG. 1 |
| 8,533,903 B2 * | 9/2013 | Muhlenkamp | ........ | A47L 9/1683 15/352 |
| 8,657,910 B2 | 2/2014 | Park et al. | | |
| 8,852,307 B2 | 10/2014 | Sikkenga et al. | | |
| 8,945,263 B2 * | 2/2015 | Sikkenga | ............... | B01D 45/08 165/158 |
| 9,182,131 B1 * | 11/2015 | Prasser | .................. | B01D 50/00 |
| 9,403,106 B2 * | 8/2016 | Oosthuizen | ........... | B01D 45/04 |
| 2003/0150198 A1 * | 8/2003 | Illingworth | ............... | A47L 5/24 55/406 |
| 2010/0018173 A1 | 1/2010 | Park et al. | | |
| 2010/0139033 A1 | 6/2010 | Makarov et al. | | |
| 2011/0016663 A1 | 1/2011 | Horne | | |
| 2011/0225764 A1 | 9/2011 | Muhlenkamp et al. | | |
| 2012/0060818 A1 * | 3/2012 | Prasser | .................. | B01D 45/08 126/1 R |
| 2012/0060820 A1 * | 3/2012 | Sikkenga | ............... | B01D 45/08 126/1 R |
| 2012/0079946 A1 * | 4/2012 | Dold | ....................... | B01D 45/08 96/425 |
| 2014/0345461 A1 * | 11/2014 | Sikkenga | ............... | B01D 45/16 95/272 |
| 2016/0025354 A1 * | 1/2016 | Sikkenga | ............... | F24C 15/2035 95/267 |
| 2017/0036149 A1 * | 2/2017 | Barley | ................... | B01D 45/08 |

* cited by examiner

APPARATUS FOR REMOVING CONTAMINATED MATERIAL

CROSS REFERENCE TO RELATED APPLICATION

BACKGROUND OF THE INVENTION

1. Technical Field

The present invention relates to an apparatus for removing a contaminated material included in high high viscosity oil droplet and fine dust.

2. Description of the Related Art

Generally, as technologies fields and including an air contaminated material, a technology for processing a particulate air contaminated material, an electrostatic precipitator, a filter dust collector, or the like, has been used. Furthermore, a technology for processing a gaseous air contaminated material, an absorption method, an adsorption method, a catalytic oxidizer, or the like, has been used. However, in the case of processing the exhaust gas containing a large amount of high viscosity oil droplet, fine dust, and a gaseous air contaminated material, at the time of applying a general processing technology, the processing efficiency decrease and a maintenance cost increases.

Particularly, at the time of using a general processing apparatus as an apparatus for processing the exhaust gas generated at the time of biomass burning and containing fine dust and oil droplet including a large amount of pyroligneous liquor generated in carbonization process, such as a charcoal kiln for charcoal production or a charcoal kiln for fomentation, processing efficiency decreases and a processing cost increases. The reason that the processing efficiency decreases and the processing cost increases is that the high viscosity oil droplet is adhered to a surface of the electrostatic precipitator, such that it is not easily separated or the high viscosity oil droplet closes a filtering pore of a filter cloth of the filter dust collector to increase differential pressure, such that it is not processed or separated, whereby the electrostatic precipitator or the filter dust collector should be replaced.

In addition, at the time of use of a general air contaminated material processing apparatus as an apparatus for processing the exhaust gas containing oil droplet generated in a process of roasting meat and fine dust or an apparatus for processing oil vapor and exhaust gas generated in a drying process, or the like, of a food processing factory and containing high viscosity and high temperature oil droplet and fine dust, it is difficult to process the exhaust gas containing the oil droplet generated in a process of roasting meat and the fine dust and the oil vapor and the exhaust gas containing the high temperature oil droplet and the fine dust. Further, even in an apparatus for processing the exhaust gas discharged from an industrial facility and containing a large amount oil droplet and oil vapor, an improved processing technology has been demanded.

In order to solve these problems, various processing systems for removing high viscosity oil droplet and fine dust in the exhaust gas of a kiln for charcoal production and a charcoal kiln for fomentation, the exhaust gas of a meat roasting restaurant, the oil vapor generated in a drying process of a food processing factory, and the exhaust gas generated in an industrial facility and containing high viscosity oil droplet and fine dust have been developed, and a technology for improving dust removing efficiency and recovering and recycling energy from high temperature exhaust gas has been required.

SUMMARY OF THE INVENTION

An object of the present document is to provide an apparatus for removing a contaminated material, the apparatus comprising: a housing having a first duct and a second duct; a plurality of partition walls slantly installed at the inside wall of the housing to form a zigzag air current; and a adsorbent discharging unit installed inside the housing to discharge an adsorbent to the zigzag air current.

Here, the first duct may be a duct for introducing an exhaust gas, and the second duct may be a duct for flowing out a clean gas where the contaminated material had been removed.

Here, the plurality of partition walls may be declinedly installed to the horizontal direction by being attached on a sidewall of the housing.

Here, the first duct may be installed at downside to a central line of the housing, and the second duct may be installed at upside to the central line.

Here, wherein the cross section of the partition wall may be bent in an arc shape.

Here, the apparatus for removing a contaminated material further comprises: an impact apparatus configured to apply an impact to the housing so as to remove the contaminated material which collects on the surfaces of the partition wall.

Here, the apparatus for removing a contaminated material further comprises: a contaminated dust receiving part configured to collect a contaminated dust which is formed by combining the contaminated material and the adsorbent.

Here, the contaminated dust receiving part is installed at the lower end of the zigzag air current which is formed by the plurality of partition walls.

Here, the apparatus for removing a contaminated material further comprises: an inducing fan configured to induce a current discharged from the second duct to the adsorbent discharging unit.

This present invention is supported by Korea Ministry of Environment as "The Eco-Innovation 21 project (401-112-018)

BRIEF DESCRIPTION OF THE DRAWINGS

The above and other objects, features and advantages of the present document will be more clearly understood from the following detailed description taken in conjunction with the accompanying drawings, in which.

DESCRIPTION OF THE PREFERRED EMBODIMENTS

Hereinafter, an energy recycling type dust removing processing system for removing a contaminated material in high temperature contaminated gas and an inertial impact type energy recovering and dust removing apparatus according to an exemplary embodiment of the present document will be described in more detail with reference to the accompanying drawings. Terms "apparatus", "units", "assembly", and "part" for components used in the following description are used only in order to easily make a specification. Therefore, the above-mentioned terms do not have meanings or roles that distinguish from each other in themselves.

Furthermore, This present invention is supported by Korea Ministry of Environment as "The Eco-Innovation 21 project(401-112-018)

Figure 1A:
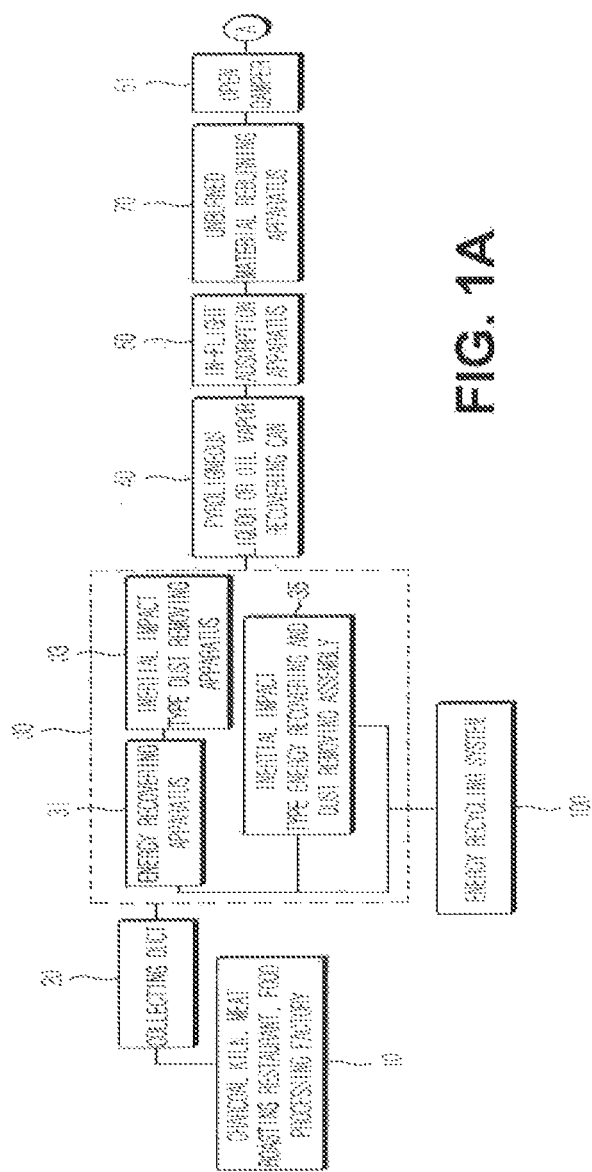
FIGS. 1A and 1B are block diagrams showing a configuration of an energy recycling type dust removing processing system for removing a contaminated material in high temperature contaminated gas according to an exemplary embodiment of the present document.
Figure 1B:
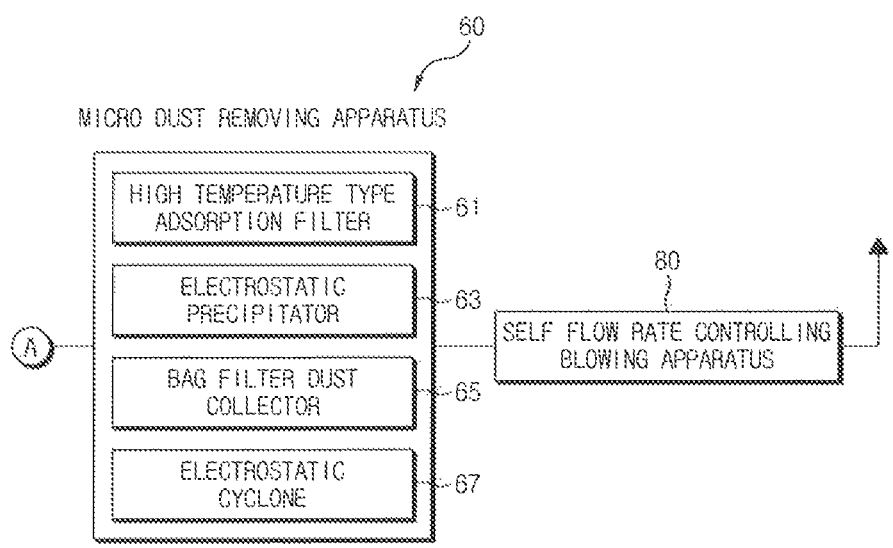

FIGS. 1A and 1B are block diagrams showing a configuration of an energy recycling type dust removing processing system for removing a contaminated material in high temperature contaminated gas according to an exemplary embodiment of the present document. As shown in FIGS. 1A and 1B, the energy recycling type dust removing processing system for removing a contaminated material in high temperature contaminated gas according to the exemplary embodiment of the present document may be configured to include a collecting duct 20 collecting a high temperature contaminated gas generated from a high temperature contamination generation source 10 (a charcoal kiln, a meat roasting restaurant, a food processing factory, or the like) and including high temperature dust; an energy recovering and inertial impact type dust removing unit 30 including an energy recovering apparatus 31, an inertial impact type dust removing apparatus 33, and an inertial impact type energy recovering and dust removing assembly 35; a pyroligneous liquor or oil vapor recovering can 40; an in-flight adsorption apparatus 50; an open damper 51; a micro dust removing apparatus 60; an unburned material returning apparatus 70; and a self flow rate controlling blowing apparatus 80.

Here, the high temperature contamination generation source 10 means a contamination generation source discharging a high temperature gas, such as the charcoal kiln for producing charcoal, the meat roasting restaurant, an incineration plant, or the like.

The collecting duct 20 serves to collect the high temperature contaminated gas generated in the high temperature contamination source 10 and including the high temperature dust. As described above, the high temperature contaminated gas collected in the collecting duct 20 is moved to the energy recovering and inertial impact type dust removing unit 30.

The energy recovering and inertial impact type dust removing unit 30 serves to recover the energy of the high temperature contaminated gas to convert the high temperature contaminated gas into middle-low temperature contaminated gas (changes cold water (refrigerant) into hot water heat generated at this time) and remove coarse dust in the contaminated gas. The energy recovering and inertial impact type dust removing unit 30 may include the energy recovering apparatus 31, the inertial impact type dust removing apparatus 33, and the inertial impact type energy recovering and dust removing assembly 35 (an integral type). An example of the energy recovering apparatus 31 will be described with reference to FIG. 3, and an example of the inertial impact type energy recovering and dust removing assembly 35 will be described with reference to FIGS. 4A and 4B.

The energy obtained from the energy recovering and inertial impact type dust removing unit 30 is recycled in an energy recycling system 100. The energy recycling system 100 will be described with reference to FIG. 2.

The in-flight adsorption apparatus 50 serves to remove fine dust in the contaminated gas in which the coarse dust is removed in the energy recovering and inertial impact type dust removing unit 30 and may include a cyclone apparatus and a chamber 300. The cyclone apparatus, which is an apparatus removing dust using centrifugal force, moves particulate matters (dust) in a fluid introduced in a tangent line of a cylindrical housing to a wall surface by the centrifugal force and allows the dust moved to the wall surface to drop downwardly and be heaped in a hopper, thereby removing the fine dust. Meanwhile, the chamber will be described in more detail with reference to FIGS. 5 to 9.

When an air inlet is closed in order to block the supply of oxygen in a carbonization process as in a charcoal kiln, a generated flow rate becomes small. Therefore, in order to supply a constant flow rate to a subsequent processing apparatus, the open damper 51 is opened to supply a constant flow rate to a subsequent processing apparatus. That is, a processed flow rate of the micro dust removing apparatus 60 is allowed to be constant, such that a processing speed is maintained to be constant, thereby increasing the processing efficiency of the micro dust removing apparatus 60.

The micro dust removing apparatus 60 serves to remove micro dust in the contaminated air from which the fine dust is removed by the chamber 300. As the micro dust removing apparatus 60, at least one of a middle performance high temperature type adsorption filter 61, an electrostatic precipitator (ESP) 63, a bag filter dust collector 65, and an electrostatic cyclone 67 may be used.

The unburned material reburning apparatus 70 includes a sensor configured to sense carbon monoxide (CO), hydrocarbon (HC), or the like, which is a combustible material. Therefore, the unburned material reburning apparatus 70 ignites and burns CO or HC using auxiliary fuel when it is sensed that concentration of CO or HC is a predetermined level or more, thereby converting CO or HC into carbon dioxide or water which is a harmless material. The unburned material reburning apparatus 70 may be installed at the front end of the open damper 51 in the case that the pyroligneous liquor is recovered or be installed between the collecting duct 20 and the energy recovering and inertial impact type dust removing unit 30 in the case that the pyroligneous liquor is not recovered.

The self flow rate controlling blowing apparatus 80 opens the open damper 51 in the case that a small amount of flow rate is introduced, such that a constant flow rate is maintained to hold efficiency of the micro dust removing apparatus 60 to be constant.

Next, a configuration of the energy recycling system 100 will be described in more detail with reference to FIG. 2.

Figure 2:
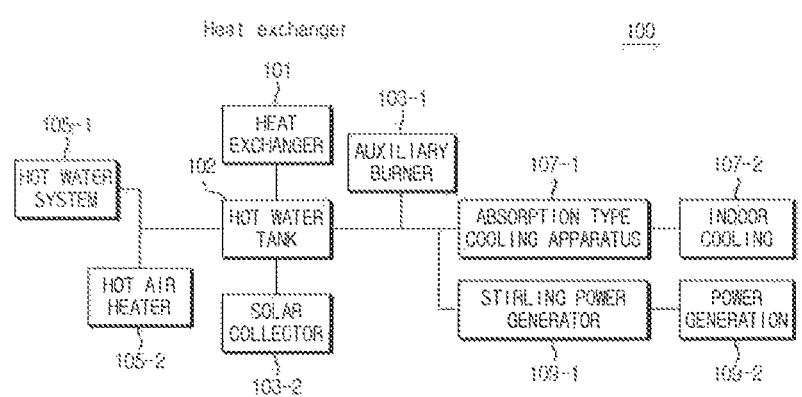
FIG. 2 is a block diagram of an energy recycling system included in the energy recycling type dust removing processing system for removing a contaminated material in high temperature contaminated gas according to the exemplary embodiment of the present document.

FIG. 2 is a block diagram of an energy recycling system included in the energy recycling type dust removing processing system for removing a contaminated material in high temperature contaminated gas according to the exemplary embodiment of the present document.

As shown in FIG. 2, the energy recycling system 100 may include a hot water tank 102 storing hot water discharged from the energy recovering and inertial impact type dust removing unit 30 therein, an auxiliary burner 103-1 and a solar collector 103-2, which are auxiliary energy units for heating the hot water tank, an absorption type cooling apparatus 107-1 performing a cooling function using the hot water of the hot water tank 102, a stirling power generator 109-1 generating power using the hot water of the hot water tank 102, a hot air heater 105-1 performing a hot air heating function using the hot water of the hot water tank 102, and a heating system 105-2 using the hot water.

Indoor cooling 107-2 may be performed by the absorption type cooling apparatus 107-1, and power generation 109-2 may be performed by the stirling power generator 109-1.

Next, structures of the energy recovering apparatus (a heat pipe) 31, the inertial impact type dust removing apparatus 33, the inertial impact type energy recovering and dust removing assembly 35, and the chamber included in the energy recovering and inertial impact type dust removing unit 30 used in the energy recycling type dust removing processing system for removing a contaminated material in high temperature contaminated gas will be described in more detail with reference to FIGS. 3A to 9.

Figure 3A:
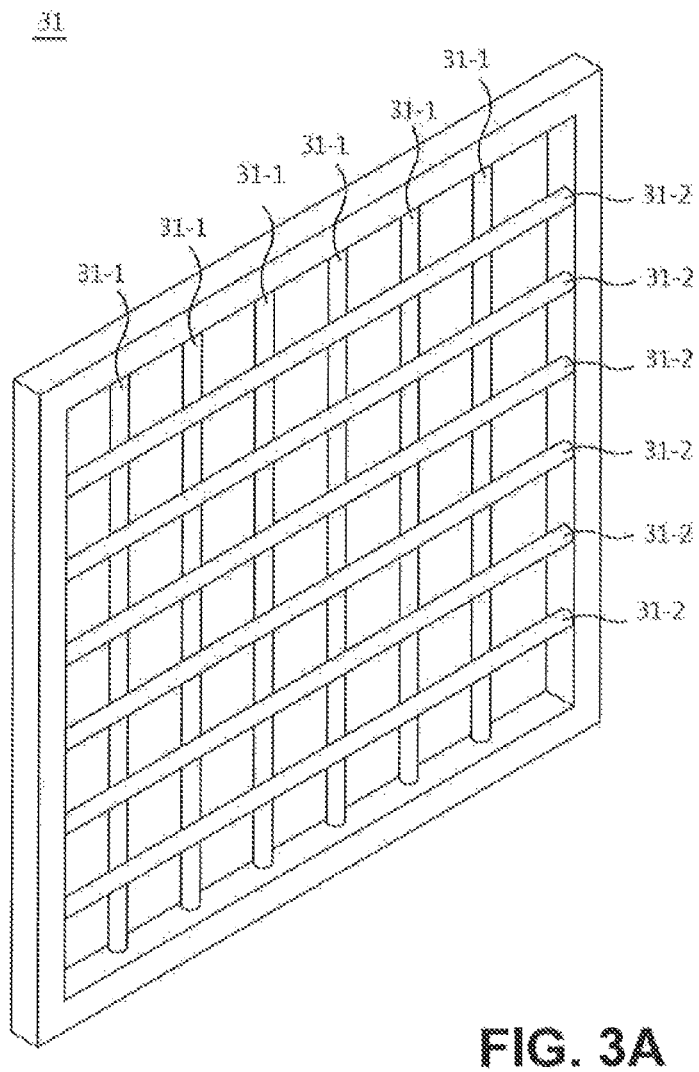
FIG. 3A is a diagram showing an example of a heat pipe used in the energy recycling type dust removing processing system for removing a contaminated material in high temperature contaminated gas according to the exemplary embodiment of the present document.

FIG. 3A is a diagram showing an example of a heat pipe (an energy recovering apparatus) used in the energy recycling type dust removing processing system for removing a contaminated material in high temperature contaminated gas according to the exemplary embodiment of the present document. As shown in FIG. 3A, the heat pipe 31 may include a plurality of first heat pipes 31-1 arranged in a first direction in a frame and a plurality of second heat pipes 31-2 arranged in a second direction perpendicular to the first direction. The high temperature contaminated gas generated in the contamination generation source 10 passes between the first and second heat pipes 31-1 and 31-2, such that heat of the high temperature contaminated gas is conducted to the first and second heat pipes. Therefore, temperatures of the first and second heat pipes 31-1 and 31-2 rise, such that the high temperature contaminated gas is converted into middle-low temperature contaminated gas. The cold water introduced into an upper or horizontal separation can is converted into hot water by the heat conducted to the heat pipe 31.

The energy recovering and inertial impact type dust removing unit in which the heat pipe shown in FIG. 3A is used will be described with reference to FIG. 3B.

Figure 3B:
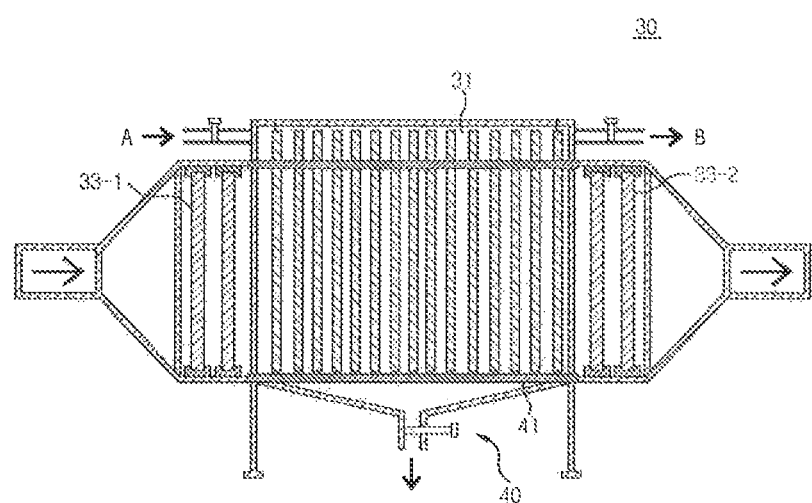
FIG. 3B is a diagram describing an energy recovering and inertial impact type dust removing unit in which the heat pipe of FIG. 3A is installed.

As shown in FIG. 3B, the energy recovering and inertial impact type dust removing unit 30 may include a first inertial impact apparatus 33-1 installed at the front end, a second inertial impact apparatus 33-2 installed at the rear end, and a plurality of heat pipes 31 installed at a central portion.

The first inertial impact apparatus 33-1 serves to remove the coarse dust in the high temperature exhaust gas collected in and introduced from the collecting duct 20 at the front end by an inertial impact phenomenon.

The plurality of heat pipes 31 increase in temperature due to the heat of the high temperature exhaust gas, as described above with reference to FIG. 3A. In this case, a temperature of water flowing (from A to B) through a waterway disposed at an upper portion of the energy recovering and inertial impact type dust removing unit 30 rises, such that the cold water is converted into the hot water and then discharged.

Meanwhile, the second inertial impact apparatus 33-2 having the same form as that of the first inertial impact apparatus 33-1 is installed at the rear end of the plurality of heat pipes 31 to remove the coarse dust once again, thereby making it possible to increase a dust removing rate.

In addition, as shown in FIG. 3B, a porous plate 41 for recovering the pyroligneous liquor is installed at a lower end portion, and the pyroligneous liquor passing through the porous plate 41 is recovered by the recovering can (not shown) installed at the lower end portion.

Next, the energy recovering and inertial impact type dust removing unit using the inertial impact type energy recovering and dust removing assembly 35 used in the energy recycling type dust removing processing system for removing a contaminated material in high temperature contaminated gas according to the exemplary embodiment of the present document will be described in detail with reference to FIGS. 4A and 4B.

Figure 4A:
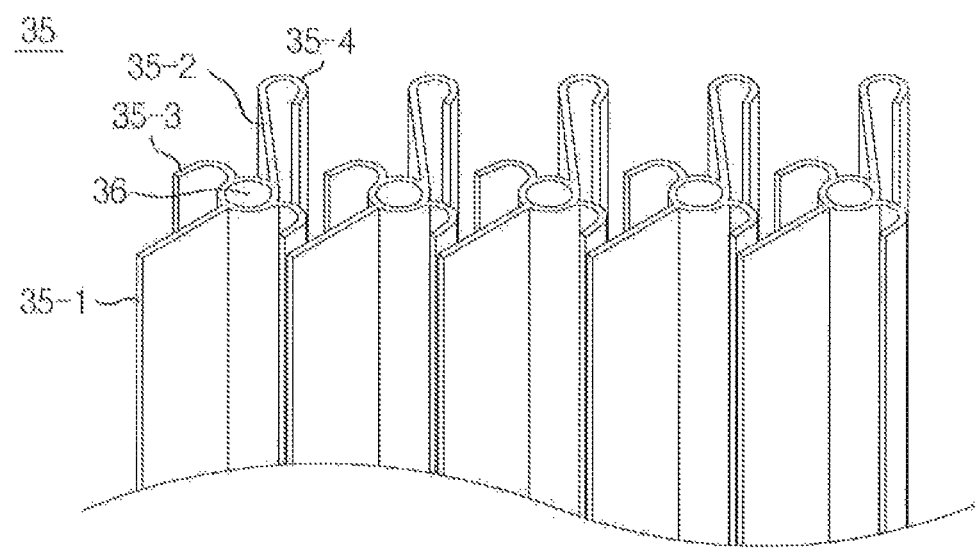
FIG. 4A is a diagram showing an example of an inertial impact type energy recovering and dust removing assembly used in the energy recycling type dust removing processing system for removing a contaminated material in high temperature contaminated gas according to the exemplary embodiment of the present document.
Figure 4B:
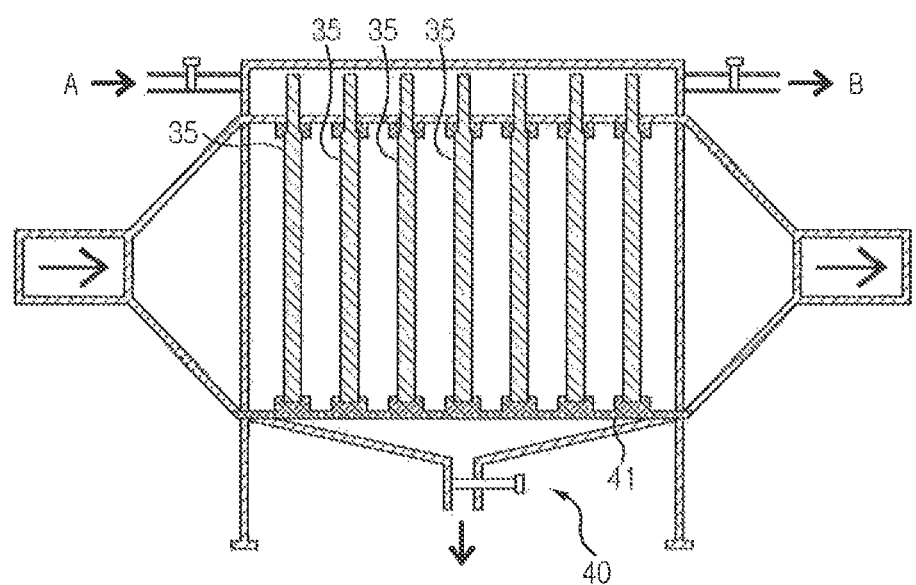
FIG. 4B is a diagram describing an energy recovering and inertial impact type dust removing unit in which the inertial impact type energy recovering and dust removing assembly of FIG. 4A is used.

FIG. 4A is a diagram showing an example of an inertial impact type energy recovering and dust removing assembly used in the energy recycling type dust removing processing system for removing a contaminated material in high temperature contaminated gas according to the exemplary embodiment of the present document.

As shown in FIG. 4A, the inertial impact type energy recovering and dust removing assembly 35 (an integral type) may include a first blade 35-1 inclined with respect to a flow of the high temperature contaminated gas by a predetermined angle to thereby be inclined with respect to a direction of a wind of the high temperature contaminated gas by a predetermined angle, a second blade 35-2 extended from the first blade 35-1 while having a bending angle, and a heat pipe 36 formed at a connection point between the first and second blades 35-1 and 35-2. The cold water may be converted into the hot water by the heat pipe 36 and then discharged.

Meanwhile, a pair of first blocking blades 35-3 is installed at the connection point between the first and second blades 35-1 and 35-2. The dust impacts the pair of first blocking blades 35-3, such that it is removed by gravity.

In addition, a second blocking blade 35-4 is installed at a rear end portion of the second blade 35-2 to remove the dust once again.

The inertial impact type energy recovering and dust removing assembly manufactured as described above may simultaneously perform the dust removal and the energy recycling.

The energy recovering and inertial impact type dust removing unit 30 in which the inertial impact type energy recovering and dust removing assembly of FIG. 4A is used will be described with reference to FIG. 4B. The energy recovering and inertial impact type dust removing unit 30 shown in FIG. 4B has substantially the same configuration as that of the energy recovering and inertial impact type dust removing unit shown in FIG. 3B. Therefore, a description thereof will be omitted. Unlike the energy recovering and inertial impact type dust removing unit shown in FIG. 3B, in the energy recovering and inertial impact type dust removing unit shown in FIG. 4B, the inertial impact type energy recovering and dust removing assembly 35 shown in FIG. 4A is installed at the center and energy from the high temperature contaminated gas is transferred to a waterway disposed at an upper portion through a heat pipe 36 disposed at the center of the inertial impact type energy recovering and dust removing assembly. Therefore, cold water supplied to the waterway disposed at the upper portion is converted into hot water, such that the hot water is discharged.

In addition, an inertial impact phenomenon is generated in each blade of the inertial impact type energy recovering and dust removing assembly 35, such that the coarse dust included in the high temperature contaminated gas is removed.

Figure 4C:
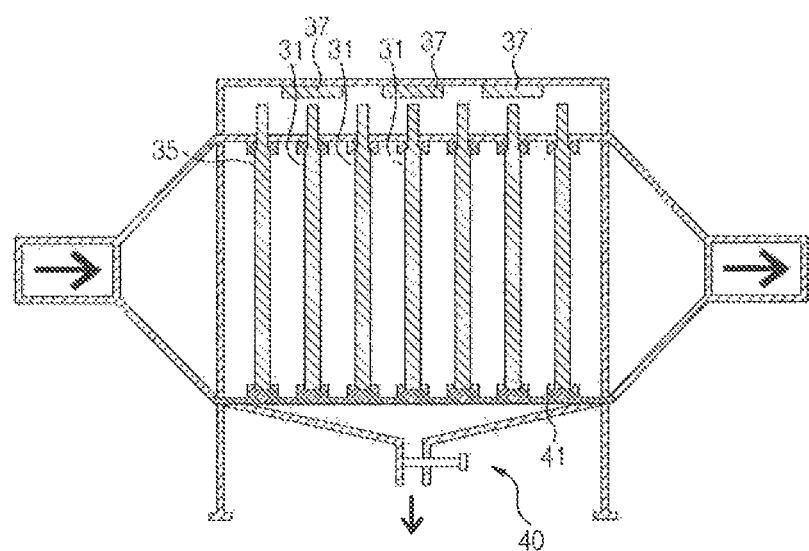
FIG. 4C shows an energy recovering and inertial impact type dust removing unit in which the air cooling off system is applied.

FIG. 4C shows an example in which the air-cooling system is applies. In case that the heat transmitted from the heat pipe 31 needs not to be used and the freeze and burst is available, the fan 37 is installed in the upper portion as shown in the FIG. 4C. Accordingly, the heat pipe 31 is heated by the contaminated air, the fan operates to cooling the heat pipe 31.

Figure 5:
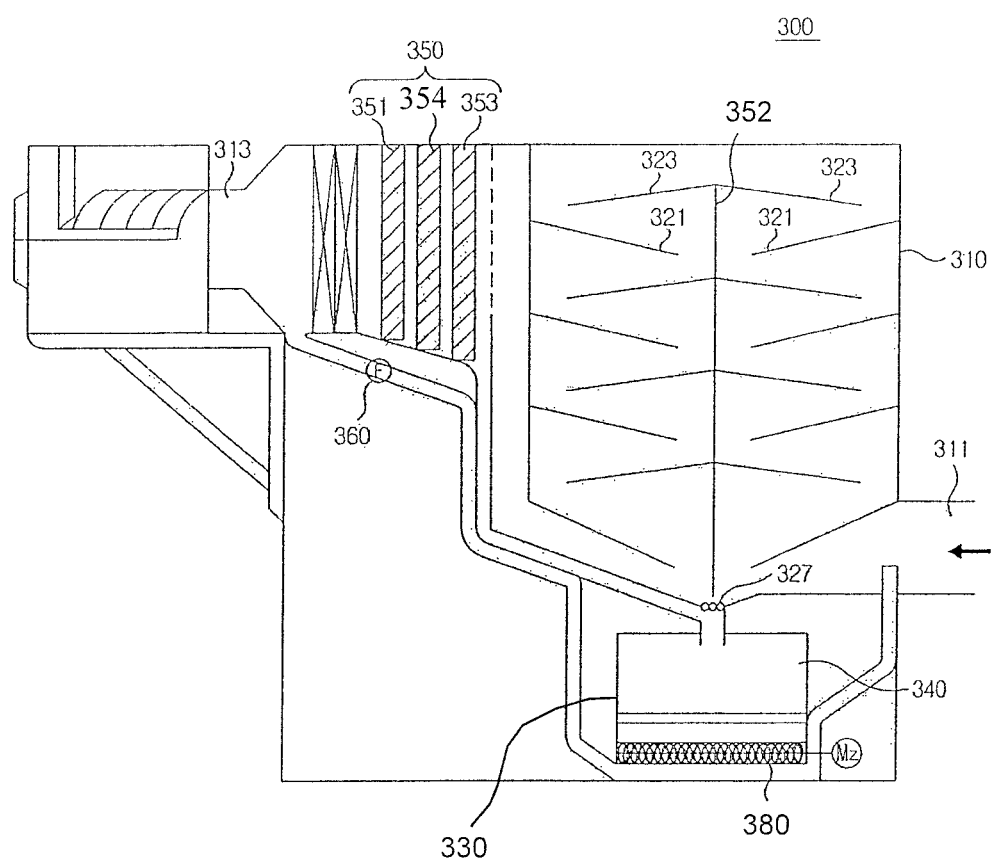
FIG. 5 is a diagram showing a first embodiment of a chamber used in an in-flight adsorption apparatus in the energy recycling type dust removing processing system for removing a contaminated material in high temperature contaminated gas according to the exemplary embodiment of the present document.

FIG. 5 is a diagram showing a first embodiment of a chamber 300 used in an in-flight adsorption apparatus in the energy recycling type dust removing processing system for removing a contaminated material in high temperature contaminated gas according to the exemplary embodiment of the present document.

As shown in FIG. 5, first partition wails 321 extended from sidewalls and second partition walls 323 extended from a central column 352 are alternately installed in a housing 310 to form a zigzag channel. This channel is connected to a first duct 311 and a second duct 313, such that exhaust gas introduced from the first duct 311 forms a zigzag air current along the channel. As shown in FIG. 5, the first and second partition walls 321 and 323 are installed to be inclined at a downward acute angle with respect to a horizontal direction of the housing 310, such that contaminated dust in which the contaminated material described above may fall down by gravity.

Meanwhile, a bottom surface of the housing 310 is provided with an adsorbent discharging unit 330. The adsorbent discharging unit 330 is an apparatus discharging an adsorbent adsorbing exhaust gas and generating an impact effect to simultaneously coarsen fine dust to the zigzag channel. As the adsorbent, activated carbon or zeolite may be used. When this adsorbent is introduced into the zigzag channel formed by the partition walls 321 and 323, it flows together with the exhaust gas along an air current of the exhaust gas in the zigzag channel to collect the contaminated material (gas and fine dust) included in the exhaust gas. When the contaminated dust becomes sufficiently heavy (that is, when the fine dust is coarsened), it falls on surfaces of the partition walls 321, 323. The dust falling as described above descends toward the bottom surface of the housing 310 due to the gravity, such that it is collected in a contaminated dust receiving part 340 through an outlet 327. In addition, the contaminated dust still present on the surfaces of the partition walls 321, 323 may fall to the contaminated dust receiving part 340 via an impact apparatus 380.

Meanwhile, an inertial impact apparatus 350 having a secondary cleaning function may be configured to have three sub-filters 351, 353 354. The fine dust of the primarily cleaned air is removed through the inertial impact apparatus 350, such that further cleaned air may be discharged to the second duct 313.

In addition, the chamber 300 may further include an inducing fan 360 installed in order to induce a portion of an air current discharged from the second duct 313 to the adsorbent discharging unit 330. Therefore, the adsorbent may be easily introduced into the zigzag channel.

Next, shapes of the partition walls used to form the zigzag channel will be described in more detail with reference to FIG. 6.

Figure 6:
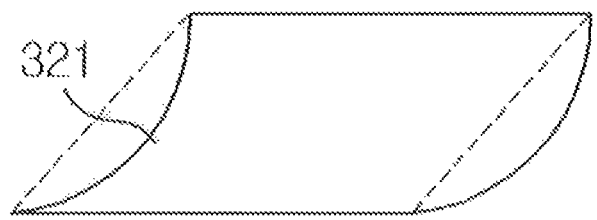
FIG. 6 is a perspective view of a partition wall used in the first embodiment of the chamber.

FIG. 6 is a perspective view of a partition wall used in the first embodiment of the chamber. As shown in FIG. 6, a partition wall module used for the first and second partition walls 321 and 323 has generally a square shape and a cross section bent in an arc shape. The partition wall module has a shape similar to that of a traditional kite. The partition wall module is formed as described above, such that the falling contaminated dust may descend.

Next, the impact apparatus will be schematically described with reference to FIGS. 7 and 8.

Figure 7:
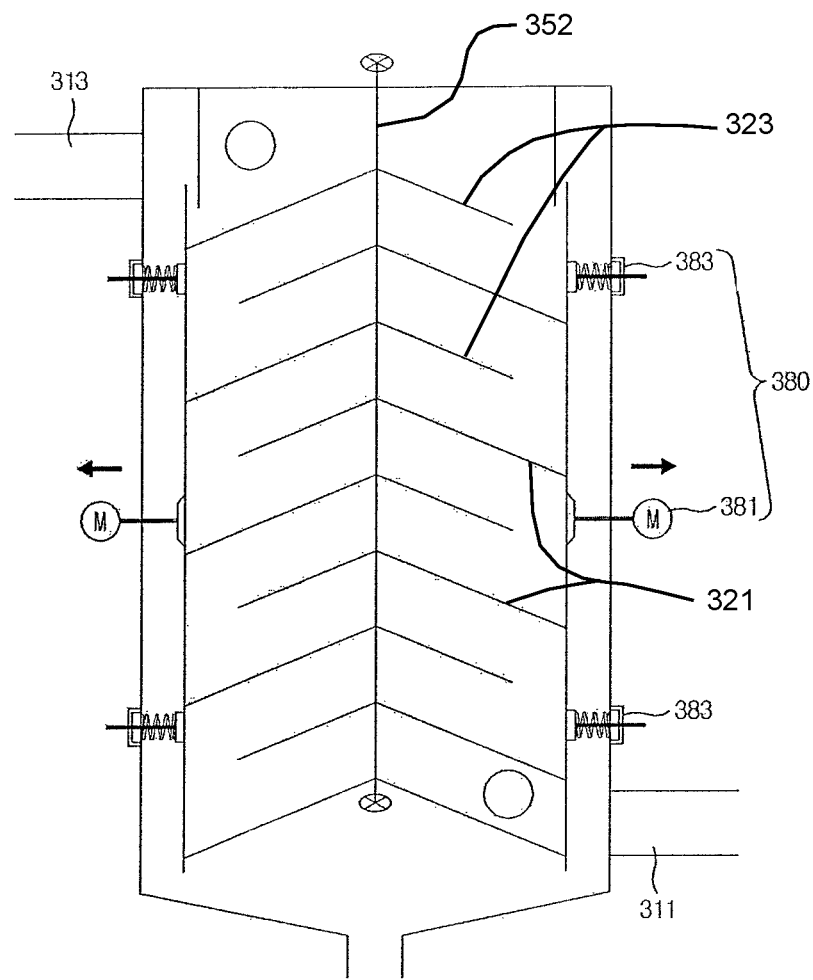
FIG. 7 is a diagram describing an example of an impact apparatus used in the first embodiment of the chamber.
Figure 8:
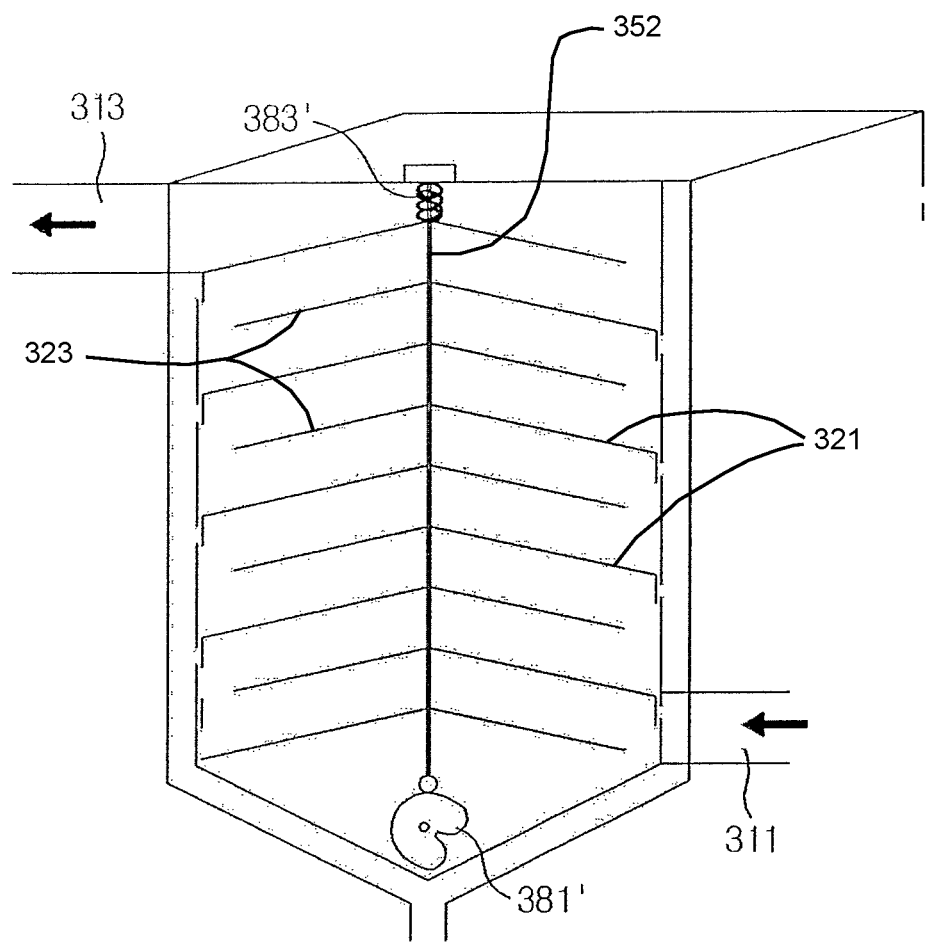
FIG. 8 is a diagram describing another example of an impact apparatus used in the first embodiment of the chamber.

FIG. 7 is a diagram describing an example of an impact apparatus used in the first embodiment of the chamber; and FIG. 8 is a diagram describing another example of an impact apparatus used in the first embodiment of the chamber. The impact apparatus 330 is an apparatus applying impact to the housing 310 in order to remove the contaminated material heaped on the surfaces of the partition walls 321, 323. According to the example shown in FIG. 7, motors 381 for applying the impact are installed at both sides of the housing 310 and buffering parts 383 are installed at upper and lower ends of the housing 310. In addition, according to another example shown in FIG. 8, in the impact apparatus 380, an impact weight 381' is disposed at a central lower portion and a buffering part 383' for buffering impact in the case that the impact is applied to the housing 310 by the impact weight 381' is installed at a ceiling part of the housing 310 on the same line as the impact weight 381'.

The chamber according to the exemplary embodiment of the present document includes the impact apparatus as described above, such that the contaminated dust adsorbed with the contaminated material of the exhaust gas is not present on the partition walls, but is collected downwardly. Therefore, maintenance may be easily made.

Next, a second embodiment of the chamber according to the exemplary embodiment of the present document will be described with reference to FIG. 9. A description of portions of the second embodiment of the chamber that are the same as those of the first embodiment of the chamber described above will be omitted for simplification.

Figure 9:
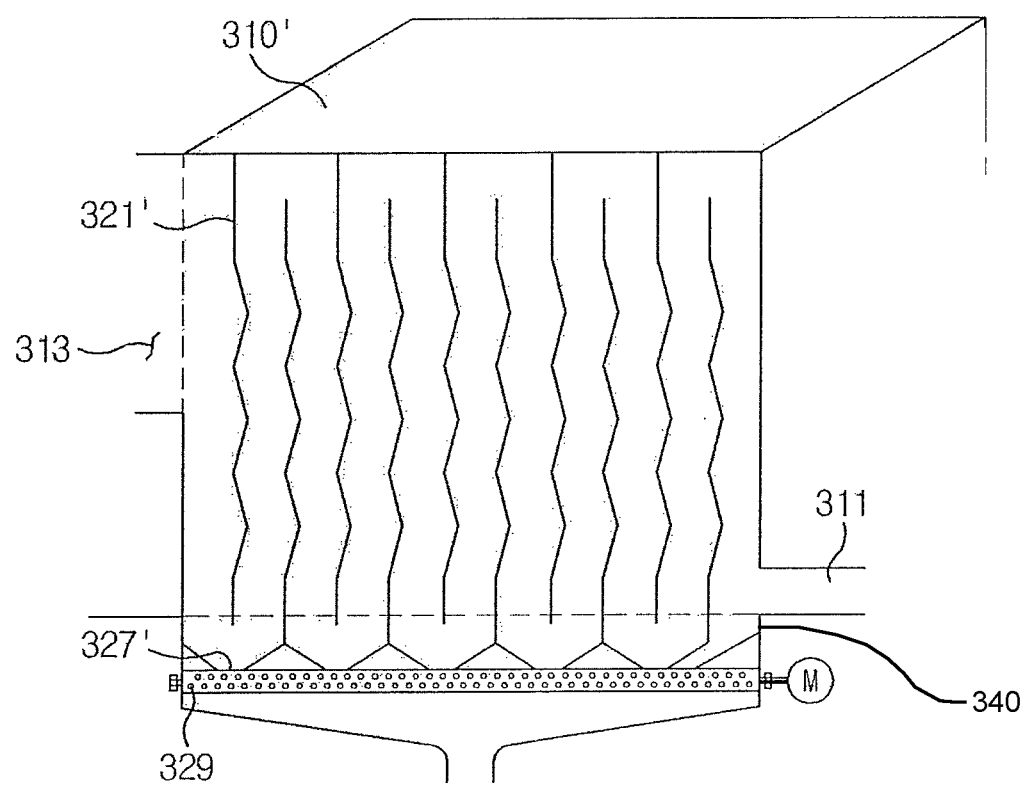
FIG. 9 is a cross-sectional view of a second embodiment of the chamber according to the exemplary embodiment of the present document.

FIG. 9 is a cross-sectional view of the second embodiment of the chamber. As shown in FIG. 9, in the second embodiment of the chamber 300 according to the exemplary embodiment of the present document, the plurality of partition walls 321' are attached to the bottom surface and the ceiling surface of the housing 310 to form a zigzag channel, such that a vertical type zigzag channel is formed unlike the first embodiment of the chamber described above. In addition, one end of the vertical type zigzag channel formed by the plurality of partition walls 321' is installed with a porous roller 329. The porous roller 329 serves to prevent air current from being divided in the contaminated dust receiving part 340 to allow the adsorbent to be adsorbed well to the contaminated dust and transfer the heavy contaminated dust to the contaminated dust receiving part 340, simultaneously with serving to transmit the contaminated dust to the contaminated dust receiving part 340.

According to a configuration of the second embodiment of the chamber 300, the contaminated dust is not attached on the surfaces of the partition walls 321, 323.

According to the exemplary embodiment of the present document having the above-mentioned configuration, the dust, which is a particulate air contaminated material in high temperature exhaust gas such as exhaust gas of a kiln for charcoal production and a charcoal kiln for fomentation, exhaust gas of a meat roasting restaurant, oil vapor generated in a drying process of a food processing factory, or the like, may be cleaned, and energy is recovered and recycled from the high temperature exhaust gas, thereby making it possible to improve energy efficiency.

In addition, according to the exemplary embodiment of the present document, coarse dust such as oil droplet, or the like, is first removed through the inertial impact type dust removing apparatus, such that there is an advantage in view of maintenance in that a dust collecting load of a subsequent micro dust removing apparatus is minimized and durability of the entire system may be increased.

Further, the channel of the chamber in the in-flight adsorption apparatus is formed in the zigzag shape to secure a residence time in which the contaminated material may be adsorbed to the adsorbent, thereby making it possible to improve removal efficiency of particulate matters and gaseous air contaminated materials.

According to the energy recycling type dust removing processing system for removing a contaminated material in high temperature contaminated gas and the inertial impact type energy recovering and dust removing apparatus as described, the configuration and the method of the exemplary embodiments described above are not restrictively applied, but all or some of the respective exemplary embodiments may be combined with each other so that the exemplary embodiments may be various modified.

What is claimed is:

1. An apparatus for removing a contaminated material, the apparatus comprising:
    a housing having a central column, a first duct and a second duct;
    a plurality of partition walls being slantly installed within the housing, a first plurality of partition walls extending from an inner surface of a sidewall of the housing toward the central column while a second plurality of partition walls extending from the central column radially outward toward the inner surface of the housing, and the first and the second plurality of partition walls being alternately arranged so as to form a zigzag channel through the housing which defines a zigzag air path for an exhaust gas flowing through the apparatus from the first duct to the second duct;
    an adsorbent discharging unit installed inside the housing to discharge an adsorbent into the zigzag air path as the exhaust gas flows through the housing;
    an inducing fan configured to induce a flow of clean gas, flowing through the second duct, back to the adsorbent discharge unit for another pass through the housing;
    wherein the adsorbent is introduced into the zigzag channel, formed by the first and the second plurality of partition walls, such that the adsorbent flows together with the exhaust gas, as the exhaust gas flows along the zigzag air path, for collecting and removing the contaminated material from the exhaust gas.

2. The apparatus of claim 1, wherein the first duct is a duct for introducing the exhaust gas, and the second duct is a duct for out flow of a clean gas after the contaminated material is removed.

3. The apparatus of claim 1, wherein the first plurality of partition walls are installed, in a downwardly declined direction relative to a horizontal direction by being attached on the inner surface of the sidewall of the housing while the second plurality of partition walls are installed, in a downwardly declined direction relative to the horizontal direction, by being attached to the central column.

4. The apparatus of claim 1, wherein the first duct is installed below a horizontal central line of the housing, and the second duct is installed above the horizontal central line.

5. The apparatus of claim 1, wherein a cross section of at least one of the partition walls is bent into an arc shape.

6. The apparatus of claim 1, further comprising:
    a contaminated dust receiving part is located adjacent a bottom of the housing and configured to collect a contaminated dust which is formed by combining the contaminated material with the adsorbent.

7. The apparatus of claim 6, wherein the contaminated dust receiving part is installed at a lower end of the zigzag channel which is formed by the first and the second plurality of partition walls.

8. The apparatus of claim 1, further comprising an inducing fan configured to induce a flow of clean gas flowing toward the second duct to the adsorbent discharging unit.

9. The apparatus of claim 1, wherein the central column, the first the second plurality of partition walls form the zigzag air path.

10. The apparatus of claim 1, wherein the adsorbent is selected from the group consisting of one of activated carbon or zeolite.

11. The apparatus of claim 1, wherein an inertial impact apparatus is located downstream of the zigzag channel, and the inertial impact apparatus removes fine dust from the cleaned gas before the cleaned gas is flows through the second duct.

12. The apparatus of claim 11, wherein the inertial impact apparatus comprises three sub-filters.

13. An apparatus for removing a contaminated material, the apparatus comprising:
    a housing having a central column, a first duct and a second duct;
    a plurality of partition walls being slantly installed within the housing, a first plurality of partition walls extending from an inner surface of a sidewall of the housing toward the central column while a second plurality of partition walls extending from the central column radially outward toward the inner surface of the housing, and the first and the second plurality of partition walls being alternately arranged so as to form a zigzag channel through the housing which defines a zigzag air path for an exhaust gas flowing through the apparatus from the fist duct to the second duct;
    an adsorbent discharging unit installed inside the housing to discharge an adsorbent into the zigzag air path as the exhaust gas flows through the housing; and
    an impact apparatus configured to apply an impact force to the housing so as to cause the contaminated material, which collects on a surface of the first and the second plurality of partition walls, to fall by gravity toward a bottom of the housing;
    wherein the adsorbent is introduced into the zigzag channel, formed by the first and the second plurality of partition walls, such that the adsorbent flows together with the exhaust gas, as the exhaust gas flows along the zigzag air path, for collecting and removing the contaminated material from the exhaust gas.

* * * * *